US009568811B2

(12) United States Patent
Kinebuchi et al.

(10) Patent No.: US 9,568,811 B2
(45) Date of Patent: Feb. 14, 2017

(54) PROJECTOR AND PROJECTION IMAGE CONTROL METHOD

(71) Applicant: SEIKO EPSON CORPORATION, Tokyo (JP)

(72) Inventors: Tadashi Kinebuchi, Okaya (JP); Kaoru Yamaguchi, Chino (JP); Koichi Miyasaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 76 days.

(21) Appl. No.: 14/643,499

(22) Filed: Mar. 10, 2015

(65) Prior Publication Data

US 2015/0268537 A1    Sep. 24, 2015

(30) Foreign Application Priority Data

Mar. 20, 2014    (JP) .................. 2014-058985

(51) Int. Cl.
| | |
|---|---|
| G03B 21/14 | (2006.01) |
| G03B 17/54 | (2006.01) |
| G03B 21/53 | (2006.01) |
| G03B 35/00 | (2006.01) |
| H04N 9/31 | (2006.01) |
| G01B 11/02 | (2006.01) |

(52) U.S. Cl.
CPC ........... *G03B 21/142* (2013.01); *G01B 11/026* (2013.01); *G03B 17/54* (2013.01); *G03B 21/53* (2013.01); *G03B 35/00* (2013.01); *H04N 9/3182* (2013.01); *H04N 9/3185* (2013.01); *H04N 9/3194* (2013.01)

(58) Field of Classification Search
CPC ..... G03B 21/26; G03B 21/147; H04N 9/3179; H04N 9/3182; H04N 9/3185; H04N 9/3194
See application file for complete search history.

(56) References Cited

U.S. PATENT DOCUMENTS

| | | | |
|---|---|---|---|
| 5,325,473 A | 6/1994 | Monroe et al. | |
| 5,969,754 A | 10/1999 | Zeman | |
| 6,984,039 B2* | 1/2006 | Agostinelli | H04N 5/7416 348/E5.139 |
| 7,365,862 B2 | 4/2008 | Hu et al. | |
| 8,933,974 B1* | 1/2015 | Marason | G09G 3/002 345/690 |
| 9,041,691 B1* | 5/2015 | Haskin | G06F 3/0421 345/175 |
| 2004/0165154 A1* | 8/2004 | Kobori | G03B 21/26 353/69 |

(Continued)

FOREIGN PATENT DOCUMENTS

| | | | |
|---|---|---|---|
| JP | H07504515 A | 5/1995 | |
| JP | 3276637 B2 | 4/2002 | |

(Continued)

*Primary Examiner* — Sultan Chowdhury

(74) *Attorney, Agent, or Firm* — Oliff PLC

(57) ABSTRACT

A projector includes a projection section adapted to project a projection image on a projection surface including a target part, a detection section adapted to detect a distance from a predetermined position to the target part, and a control section adapted to set an area to be projected on the projection surface other than the target part out of the projection image as a partial area based on the distance thus detected, and change a display state of the projection image so that the partial area set is masked.

12 Claims, 9 Drawing Sheets

(56) References Cited

U.S. PATENT DOCUMENTS

2008/0106706 A1* 5/2008 Holmgren .............. G03B 21/14
                                                   353/121
2012/0287247 A1   11/2012 Stenger et al.

FOREIGN PATENT DOCUMENTS

JP    2007-121293 A    5/2007
JP    2012-248183 A   12/2012

* cited by examiner

PROJECTOR AND PROJECTION IMAGE CONTROL METHOD

The entire disclosure of Japanese Patent Application No. 2014-058985, filed Mar. 20, 2014 is expressly incorporated by reference herein.

BACKGROUND

1. Technical Field

The present invention relates to a projector and a projection image control method.

2. Related Art

There has been studied and developed a method or the like of space production for projecting an image on a wall, an object or the like other than a screen using a projector to thereby decorate a room in a pseudo manner.

In conjunction with the above, there has been known a device for displaying an image of an object on the object itself in a superimposed manner to change the appearance such as the contrast of the object to thereby emphasize the object (see Japanese Patent No. 3276637 (Document 1)).

Further, there has been known an image display device for performing coloring or drawing on an object while monitoring light, which is projected on the object, via an interface device (see JP-T-7-504515 (Document 2).

Further, in JP-A-2012-248183 (Document 3), there is described the fact that a depth sensor is used for measuring the three-dimensional shape of an object on which the projection image is projected (see Document 3).

Further, in JP-A-2007-121293 (Document 4), there is described the fact that the outline of an object is obtained using CAD (Computer Aided Design) data or edge detection when checking presence or absence of a defect of the object (see Document 4).

However, in the device and the method of the related art, it has not been considered to prevent an area other than the desired area out of the projection surface, on which a projection image is projected, from being emphasized.

SUMMARY

An advantage of some aspects of the invention is to provide a projector and a projection image control method capable of preventing the area other than the desired area out of the projection surface, on which the projection image is projected, from being emphasized.

An aspect of the invention is directed to a projector including a projection section adapted to project a projection image on a projection surface including a target part, a detection section adapted to detect a distance from a predetermined position to the target part, and a control section adapted to set an area to be projected on the projection surface other than the target part out of the projection image as a partial area based on the distance, and change a display state of the projection image so that the partial area set is masked.

According to this configuration, the projector projects the projection image on the projection surface including the target part, then detects the distance from a predetermined position to the target part, then sets the area to be projected on the projection surface other than the target part out of the projection image as the partial area based on the distance thus detected, and then changes the display state of the projection image so that the partial area thus set is masked. Thus, the projector can prevent the area other than the desired area out of the projection surface on which the projection image is projected from being emphasized.

As another aspect of the invention, the projector according to the aspect of the invention may be configured such that the control section changes the display state of the projection image so that the partial area is masked by preventing light from being projected.

According to this configuration, the projector changes the display state of the projection image so that the partial area is masked by not projecting the light. Thus, the projector can inhibit the light from the projector from bedazzling the person having entered the area set as the partial area, and can further inhibit the area other than the target part from being emphasized.

As another aspect of the invention, the projector according to the aspect of the invention may be configured such that the control section changes the display state of the projection image so that the partial area is masked by projecting an image with a single color.

According to this configuration, the projector changes the display state of the projection image so that the partial area is masked by projecting the image with the single color. Thus, the projector can inhibit the contrast and so on of the area other than the target part from being emphasized, and as a result, the projector can inhibit the area other than the target part from being emphasized.

As another aspect of the invention, the projector according to the aspect of the invention may be configured such that the projector further includes an imaging section adapted to take a taken image including the target part, and the detection section detects the distance based on the taken image.

According to this configuration, the projector detects the distance from the predetermined position to the target part based on the taken image. Thus, the projector can detect the distance from the predetermined position to the target part without using an additional sensor for measuring the distance, and thus, the cost and the trouble for installing the additional sensor can be saved.

As another aspect of the invention, the projector according to the aspect of the invention may be configured such that the detection section is a depth sensor.

According to this configuration, the projector detects the distance from the predetermined position to the target part using the depth sensor. Thus, since it becomes unnecessary for the projector to install the projection section and the imaging section at respective positions where a triangulation method with the projection section and the imaging section can be performed, the degree of freedom of installation positions of the projection section and the imaging section can be raised.

As another aspect of the invention, the projector according to the aspect of the invention may be configured such that the projector further includes an adjustment section adapted to adjust the projection section so that the projection image is focused on a predetermined position in the target part when projecting the projection image.

According to this configuration, the projector adjusts the projection section so that the focal position is set at a predetermined position in the target part when projecting the projection image. Thus, the projector can focus the projection image on the target part.

As another aspect of the invention, the projector according to the aspect of the invention may be configured such that the control section sets a first partial area having the distance longer than a first threshold value, a second partial area having the distance shorter than a second threshold value, and a third partial area having the distance within a range between the first threshold value and the second threshold value as the partial area corresponding to the distance, and changes the display state of the projection image so that either one or both of the first partial area and the second partial area is masked.

According to this configuration, the projector sets the first partial area having the distance described above longer than the first threshold value, the second partial area having the distance described above shorter than the second threshold value, and the third partial area having the distance described above within the range between the first threshold value and the second threshold value as the partial area corresponding to the distance from the predetermined position to the target part, and then changes the display state of the projection image so that either one or both of the first partial area and the second partial area is masked. Thus, the projector can more surely inhibit the area other than the target part from being emphasized by masking, for example, the first partial area and the second partial area.

Another aspect of the invention is directed to a projection image control method including projecting a projection image on a projection surface including a target part, detecting a distance from a predetermined position to the target part, and setting an area to be projected on the projection surface other than the target part out of the projection image as a partial area based on the distance, and changing a display state of the projection image so that the partial area set is masked.

According to this configuration, the projection image control method projects the projection image on the projection surface including the target part, then detects the distance from a predetermined position to the target part, then sets the area to be projected on the projection surface other than the target part out of the projection image as the partial area based on the distance thus detected, and then changes the display state of the projection image so that the partial area thus set is masked. Thus, the projection image control method can prevent the area other than the desired area out of the projection surface on which the projection image is projected from being emphasized.

As described above, the projector and the projection image control method project the projection image on the projection surface including the target part, then detect the distance from a predetermined position to the target part, then set the area to be projected on the projection surface other than the target part out of the projection image as the partial area based on the distance thus detected, and then change the display state of the projection image so that the partial area thus set is masked. Thus, the projection image control method can prevent the area other than the desired area out of the projection surface on which the projection image is projected from being emphasized.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
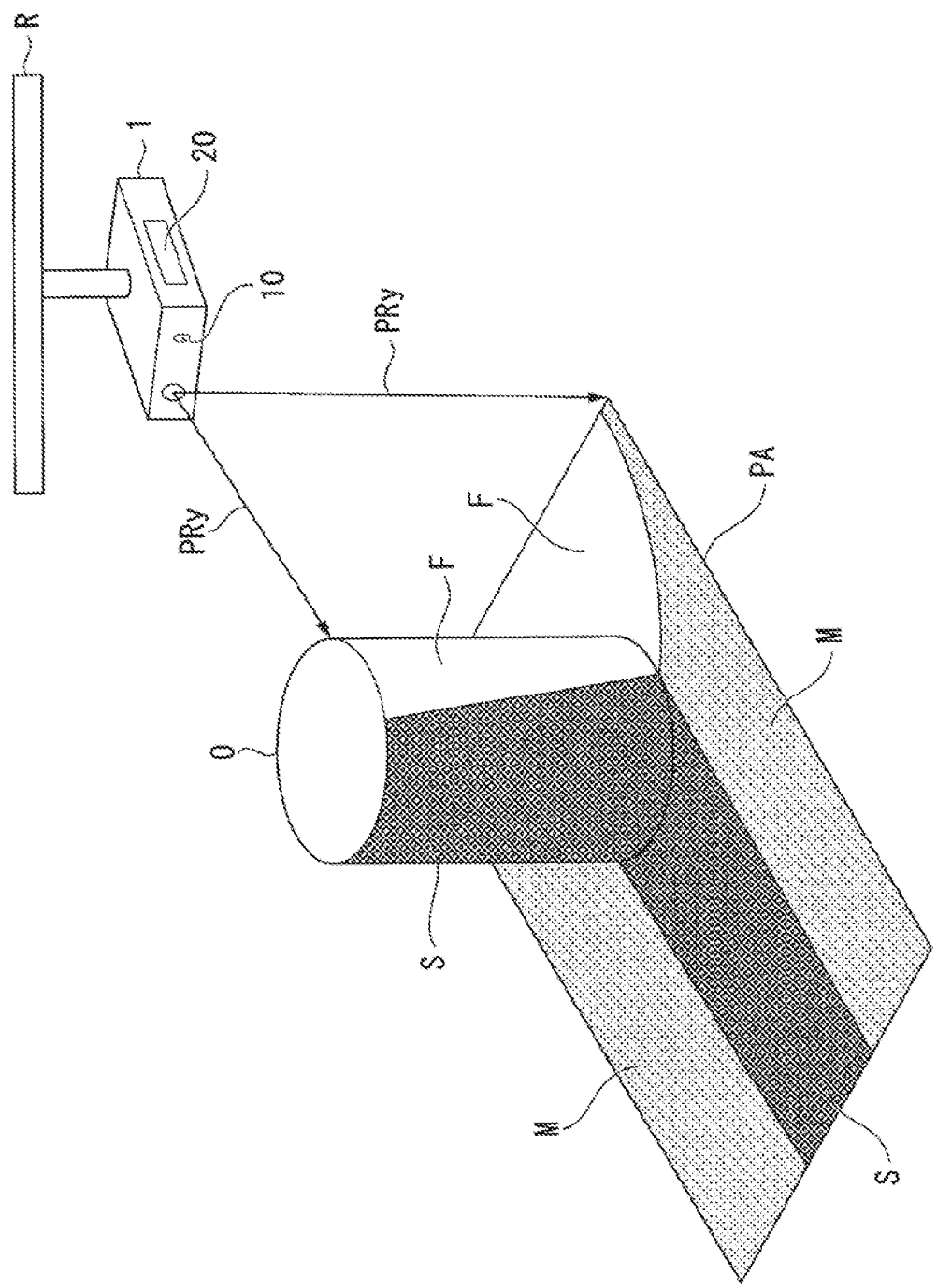
FIG. 1 is a diagram schematically showing an example of how a projector 1 according to a first embodiment of the invention is used.

A first embodiment of the invention will hereinafter be explained with reference to the accompanying drawings. FIG. 1 is a diagram schematically showing an example of how a projector 1 according to the first embodiment is used. In the first embodiment, the projector 1 is provided with an imaging section 10 and a control section 20.

The projector 1 projects the projection image P on the projection surface PA. The projection surface PA denotes a surface on which the projection image P is projected, and corresponds to a surface of an object O and the periphery thereof in FIG. 1. The projection surface PA can also be an uneven wall surface, an even surface, a screen, or the like instead thereof. In FIG. 1, a light beam PRy is the light of the projection image P to be projected on the projection surface PA from the projector 1. Further, the projector 1 is suspended by a rail R, and is disposed so as to project the projection image P from the ceiling side toward the projection surface PA.

The object O is an object having a columnar shape shown in FIG. 1 as an example, but can also be an object having other shapes such as a quadratic prism shape or a conical shape instead thereof. The object O is installed on a floor, a table, or the like. Further, the object O is installed at a position at which the projection image P is projected from the projector 1, and the image of which can be taken by the imaging section 10. The object O is an example of a target part. It should be noted that the projector 1 can also be installed on a platform such as a table, a floor surface, a wall surface, or the like instead of such a configuration in which the projector 1 is suspended by the rail R as shown in FIG. 1.

The imaging section 10 is, for example, a camera provided with an imaging element for converting the light collected into an electric signal such as a charge coupled device (CCD) or a complementary metal oxide semiconductor (CMOS). In the first embodiment, the imaging section 10 is formed of hardware integrated with the projector 1. The imaging section 10 can also be formed as a member separated from the projector 1 instead of being integrated with the projector 1, and is connected to the projector 1 with wire or wirelessly so as to be able to communicate with the projector 1. The imaging section 10 is disposed at a position in which the imaging section 10 can image a part or the whole of the range including the projection surface PA.

The control section 20 controls each of the functional sections of the projector 1. The display control section 20 obtains the taken image C from the imaging section 10. The control section 20 detects the three-dimensional position information representing the three-dimensional shape of the projection surface PA based on the taken image C thus obtained. The three-dimensional position information representing the three-dimensional shape of the projection surface PA denotes, for example, the information including distances from the optical center of the imaging section 10 to respective points on the projection surface PA, and the three-dimensional coordinates of the respective points on the projection surface PA so as to correspond to each other, but can also be the information having distances from a predetermined reference position to the respective points on the projection surface PA and the three-dimensional coordinates of the respective points on the projection surface PA so as to correspond to each other instead of the information described above.

The control section 20 masks an area on the taken image C, which is distant more than a predetermined distance from the optical center of the imaging section 10, based on the three-dimensional position information representing the three-dimensional shape thus detected. The area on the taken image thus masked is hereinafter referred to as a mask area. Further, the area on the taken image not masked is referred to as a projection area. The term "masking" denotes an action of projecting no light on the mask area thus set, but can also be an action of projecting light with the same color (e.g., gray or blue) to the mask area instead of the action described above. It should be noted that the mask area is an example of a partial area.

The case in which the control section 20 fails to project the light to thereby mask the mask area of the taken image C will hereinafter be explained. The predetermined distance corresponds to, for example, the distance to the position on the taken image C, which is on the surface of the object O furthest from the optical center of the imaging section 10, out of the three-dimensional position information representing the three-dimensional shape thus detected, but can also be the distance to other some predetermined positions such as a distance from the optical center of the imaging section 10 to the center of the object O instead of the distance described above.

The control section 20 controls the projector 1 to project the taken image C, in which with the mask area is set, on the projection surface PA as the projection image P. In FIG. 1, it is assumed that the control section 20 sets an area M, which is provided with hatching out of the projection surface PA, as the mask area, and sets the area F, which is not provided with hatching, as the projection area. Further, the area S provided with hatching out of the projection surface PA represents the area of the shade where the light of the projection image P is blocked by the object O.

Since the control section 20 can emphasize the contrast, the outline, the pattern, and so on of the object O by projecting the taken image C, to which the mask area M is set, on the projection surface PA as the projection image P, and further, at least a part of an area other than the object O is masked as described above, it is possible to inhibit the range, which the user does not want to emphasize, such as the periphery of the object O from being emphasized. Further, since at least a part of the area other than the object O is masked by preventing the light from being projected, in the case in which a person is located in an area further from the projector 1 than the object O (on an opposite side to the side where the projector 1 is located when viewed from the object O), the control section 20 can inhibit the light from being projected to the person and bedazzling the person. It should be noted that in some cases, the state in which no mask area is set in the taken image C is hereinafter explained as the state in which no mask area is set in the projection image P for the sake of convenience of explanation.

Figure 2:
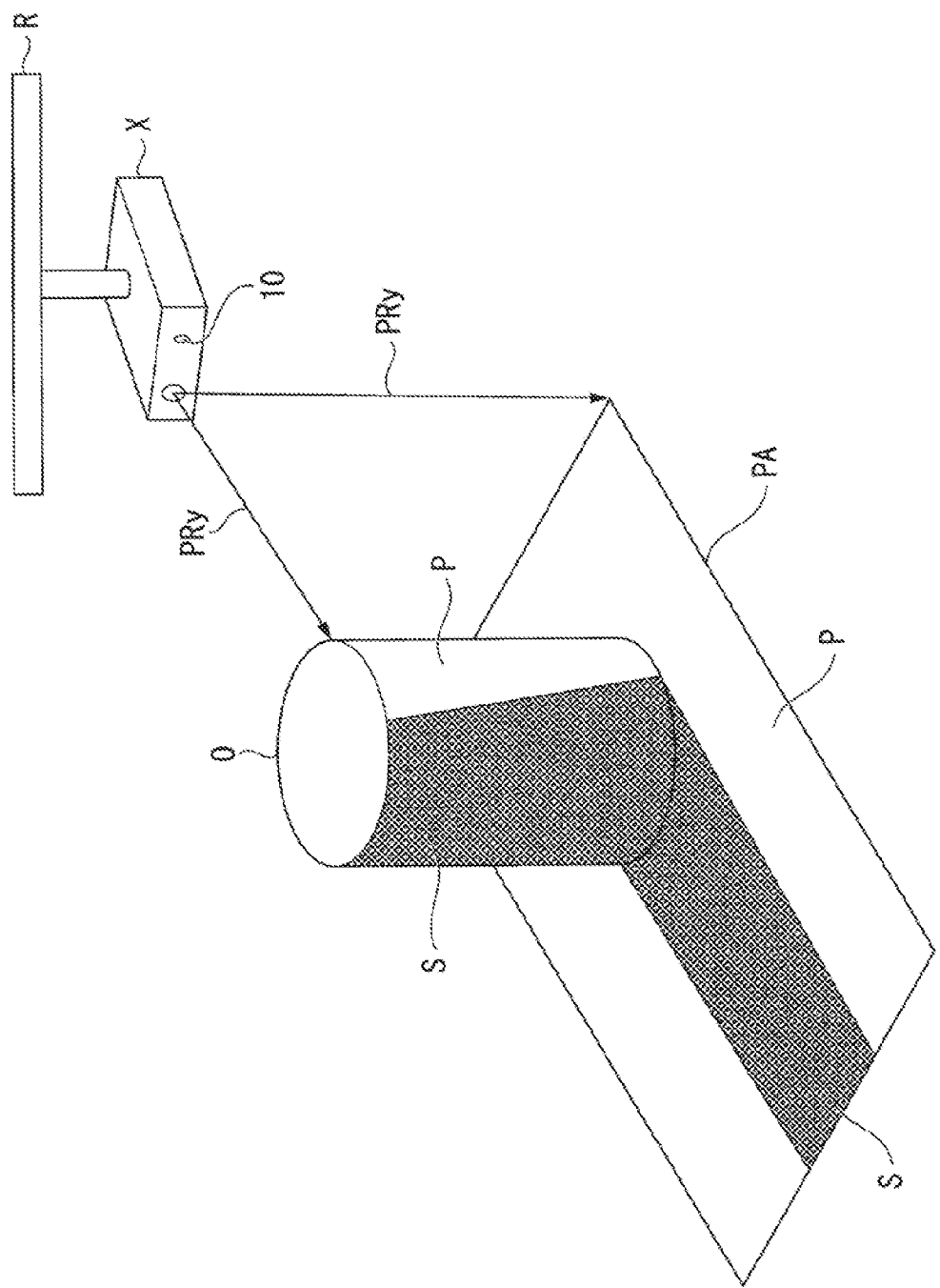
FIG. 2 is a diagram schematically showing an example of how a projector X is used.

Here, a projector X having no mask area set in the projection image P and the projector 1 will be compared with each other with reference to FIG. 2. FIG. 2 is a diagram schematically showing an example of how the projector X is used. The projector X is not provided with the mask area M set to the projection image P, and therefore projects the light of the projection image P to the area further from the projector X than the object O out of the projection surface PA. Therefore, in the projector X, the range, which the user does not want to emphasize, such as the periphery of the object O or the like is emphasized. Further, in the case in which a person is located in the area further from the projector X than the object O, the projector X bedazzles the person by projecting the light to the person in some cases. Therefore, compared to the projector X, the projector 1 can more clearly emphasize the object O, and further, even in the case in which a person is located in the area further from the projector 1 than the object O, the projector 1 can inhibit the light from being projected to the person and from bedazzling the person.

Figure 3:
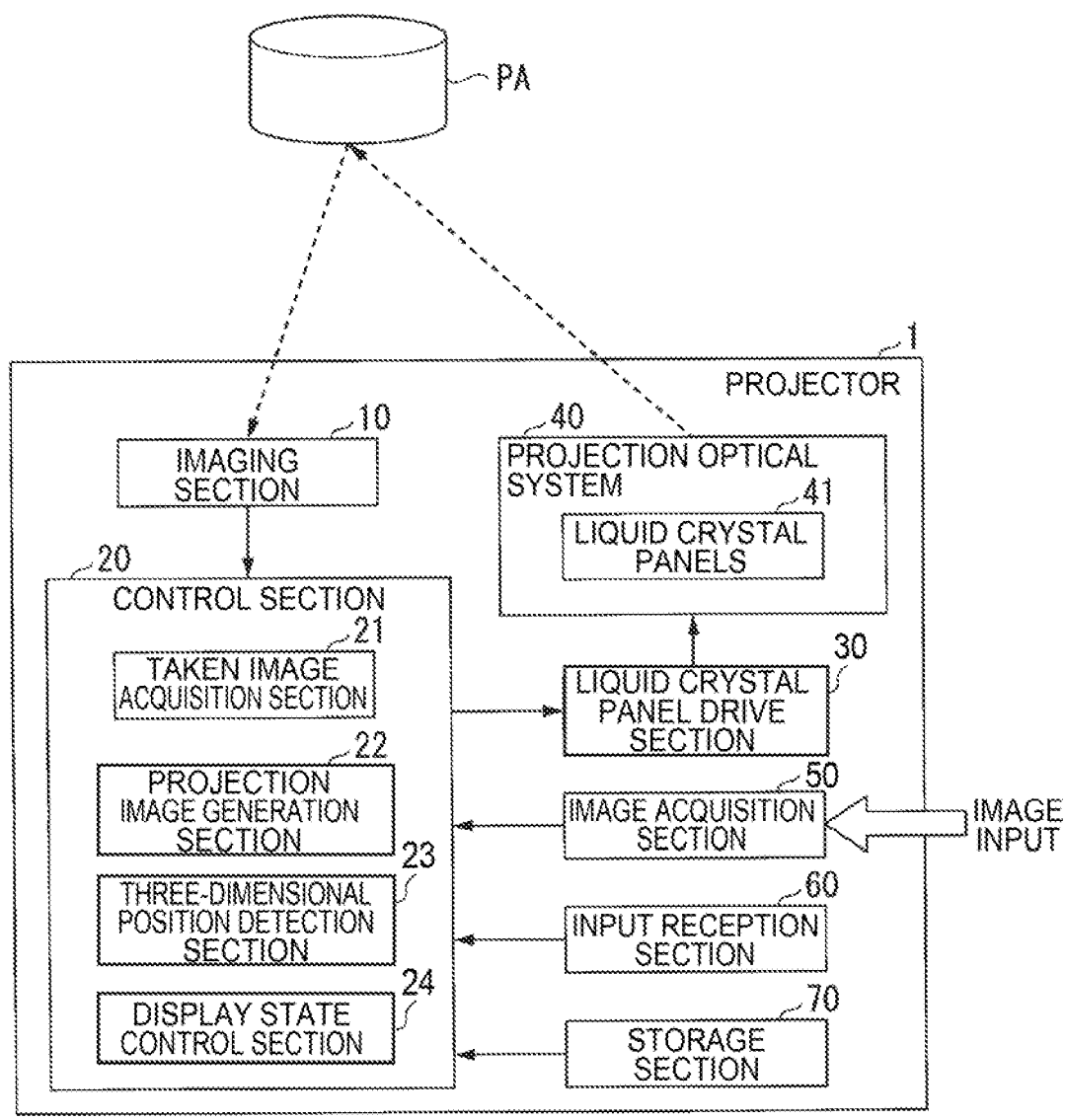
FIG. 3 is a diagram showing an example of a functional configuration of the projector 1.

Then, a functional configuration of the projector 1 will be explained with reference to FIG. 3. FIG. 3 is a diagram showing an example of the functional configuration of the projector 1. The projector 1 is provided with a liquid crystal panel drive section 30, a projection optical system 40, an image acquisition section 50, an input reception section 60, and a storage section 70 in addition to the imaging section 10 and the control section 20.

The control section 20 is provided with a taken image acquisition section 21, a projection image generation section 22, a three-dimensional position detection section 23, and a display state control section 24. The control section 20 has a function of making the imaging section 10 take an image of apart or the whole of the range, in which the projection image P including the object O is projected, in addition to the function described above.

The taken image acquisition section 21 obtains the taken image, which has been taken by the imaging section 10, from the imaging section 10.

The projection image generation section 22 converts an image signal obtained from the image acquisition section 50 into image information representing a grayscale of each of pixels of each of liquid crystal panels 41 provided to the projection optical system 40 for the respective colors of RGB (red, green, and blue). Further, the projection image generation section 22 converts the taken image C into the image information described above for projecting the taken image C as the projection image P in accordance with a request from the display state control section 24. Further, the projection image generation section 22 masks the area set as the mask area when converting the taken image into the image information in accordance with a request from the display state control section 24.

The three-dimensional position detection section 23 detects the three-dimensional position information representing the three-dimensional shape of the projection surface PA described above based on the taken image C obtained from the imaging section 10 in the projector 1 in an initialization mode.

The display state control section 24 sets the mask area M on the taken image C based on the three-dimensional position information representing the three-dimensional shape of the projection surface PA detected by the three-dimensional position detection section 23. Further, the display state control section 24 performs a geometric correction and a color correction on the taken image C. Further, the display state control section 24 controls the projection image generation section 22 to convert the taken image C, on which the geometric correction, the color correction, and the mask area setting have been performed, into the image information of the projection image P.

The liquid crystal panel drive section 30 applies a drive voltage corresponding to the image information input from the projection image generation section 22 of the control section 20 to (drives) each of the pixels of each of the liquid crystal panels 41 provided to the projection optical system 40. In accordance with the application of the drive voltage, the liquid crystal panel drive section 30 makes the liquid crystal panels 41 form the light, which has entered the liquid crystal panels 41 from a light source not shown and provided to the projection optical system 40, as the light reflecting the image corresponding to the image information.

The projection optical system 40 is provided with the liquid crystal panels 41. The projection optical system 40 includes a reflector for reflecting the light, which has been emitted by the light source, toward the liquid crystal panels 41, and forms the light, which has been reflected, on the liquid crystal panels 41 as the light reflecting the image corresponding to the image information. Further, the projection optical system 40 projects the light, which reflects the image having been formed on the liquid crystal panels 41, on the projection surface PA through a projection lens not shown. It should be noted that the light source is a discharge light source lamp formed of, for example, a super-high pressure mercury lamp or a metal halide lamp, but is not limited to the light source lamp, and a light emitting diode (LED) light source, a laser source, and so on can also be used as the light source.

The liquid crystal panels 41 are each, for example, a transmissive liquid crystal panel having a liquid crystal encapsulated between a pair of transparent substrates, and correspond respectively to RGB, the three primary colors of light. It should be noted that the liquid crystal panels 41 are not limited to the transmissive liquid crystal panels, but can also be reflective liquid crystal panels. Further, digital mirror devices (DMD) or the like can also be used instead of the liquid crystal panels 41.

The image acquisition section 50 obtains an external image signal via an image input terminal or the like, and then outputs the image signal thus obtained to the control section 20.

The input reception section 60 corresponds to, for example, a variety of operation buttons, operation keys, and a touch panel for receiving an instruction from the user, and so on. It should be noted that the input reception section 60 is not limited to one provided to (incorporated in) the projector 1, but can also be a remote controller, which is provided with a variety of operation buttons, operation keys, a touch panel, and so on for receiving an input from the user, and transmits information, which represents the input having been received from the user, wirelessly or with wire. In such a case, the projector 1 is provided with a receiving section for receiving the information transmitted from the remote controller.

The storage section 70 includes, for example, a random access memory (RAM), a register, a hard disk drive (HDD), or a solid-state drive (SSD). The storage section 70 stores a variety of types of information, programs, and so on to be processed by the projector 1.

Figure 4:
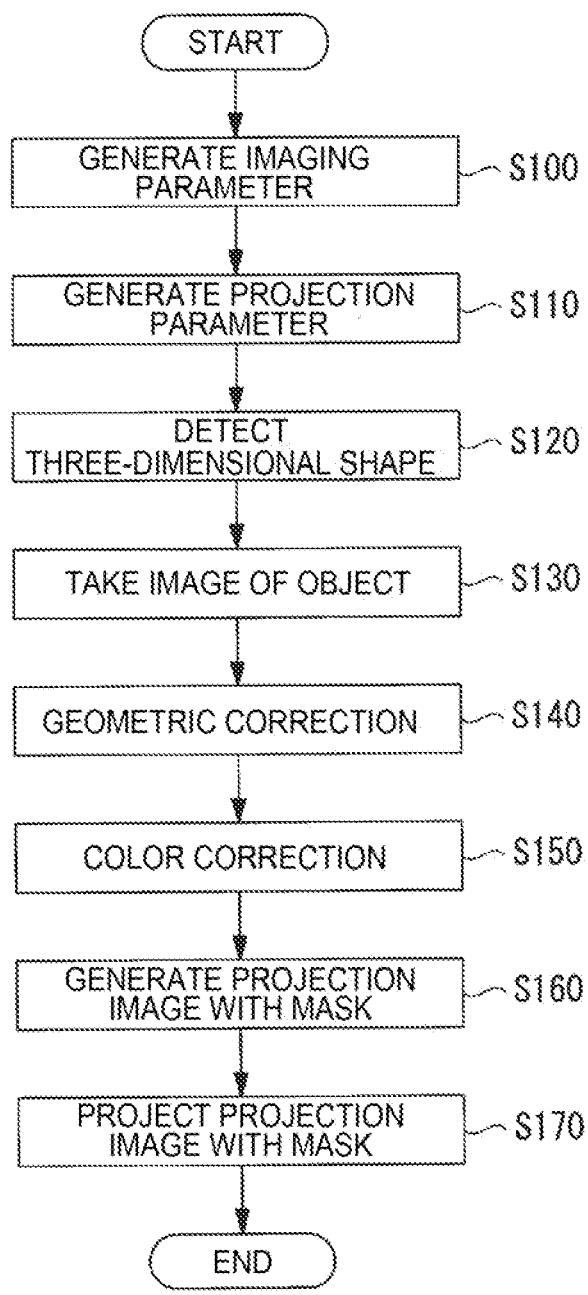
FIG. 4 is a flowchart showing an example of a flow of a process performed until a control section 20 makes the projector 1 project a projection image P to which a mask area M is set.

A process performed until the control section 20 makes the projector 1 project the projection image P, to which the mask area M is set, will hereinafter be explained with reference to FIG. 4. FIG. 4 is a flowchart showing an example of a flow of the process performed until the control section 20 makes the projector 1 project the projection image P to which the mask area M is set. Firstly, the control section 20 makes the imaging section 10 takes an image of a reference object Z installed as a substitute of the object O as a calibration of the imaging section 10, and generates (step S100) an imaging parameter based on the taken image BC thus taken. The imaging parameter is information including world coordinates and coordinates on the taken image BC (i.e., coordinates on the imaging element) so as to be associated with each other.

More specifically, the control section 20 detects a reference point of the reference object Z, the world coordinate of which has previously been known, from the taken image BC, and then associates the coordinate on the taken image BC of the reference point thus detected with the world coordinate. The control section 20 performs this association process on every point (pixel) on the taken image BC, and then stores the result in the storage section 70 as the imaging parameter.

Then, as the calibration of the projector 1, the control section 20 makes the projector 1 project pattern light with a gray code to the reference object Z as a projection image PP, makes the imaging section 10 take an image of the reference object Z to which the projection image PP is projected, and then associates a coordinate on the taken image PC with a coordinate on the projection image PP via a world coordinate based on the taken image PC thus taken. The control section performs this process on every point (pixel) on the projection image PP, and then stores (step S110) the result in the storage section 70 as a projection parameter.

The explanation will hereinafter be presented assuming that the user replaces the reference object Z with the object O after the step S110. The three-dimensional position detection section 23 projects the projection image PP to the projection surface PA to detect (step S120) the three-dimensional position information representing the three-dimensional shape of the projection surface PA. More specifically, the three-dimensional position detection section 23 reads in the imaging parameter and the projection parameter from the storage section 70. Further, the control section 20 takes an image of the projection surface PA, on which the projection image PP is projected, as a taken image XC. The three-dimensional position detection section 23 detects the distances from the optical center of the imaging section 10 to the respective positions represented by the world coordinates associated with the respective points on the taken image XC using an active shutter 3D method based on the imaging parameter and the projection parameter thus read in and the taken image XC thus taken to thereby detect the three-dimensional position information representing the three-dimensional shape of the projection surface PA. It should be noted that the three-dimensional position detection section 23 can also have a configuration of detecting the distances based on some other known technologies instead of the configuration of detecting the distances from the optical center of the imaging section 10 to the positions represented by the world coordinates associated with the respective points on the taken image XC using the active shutter 3D method.

Figure 5:
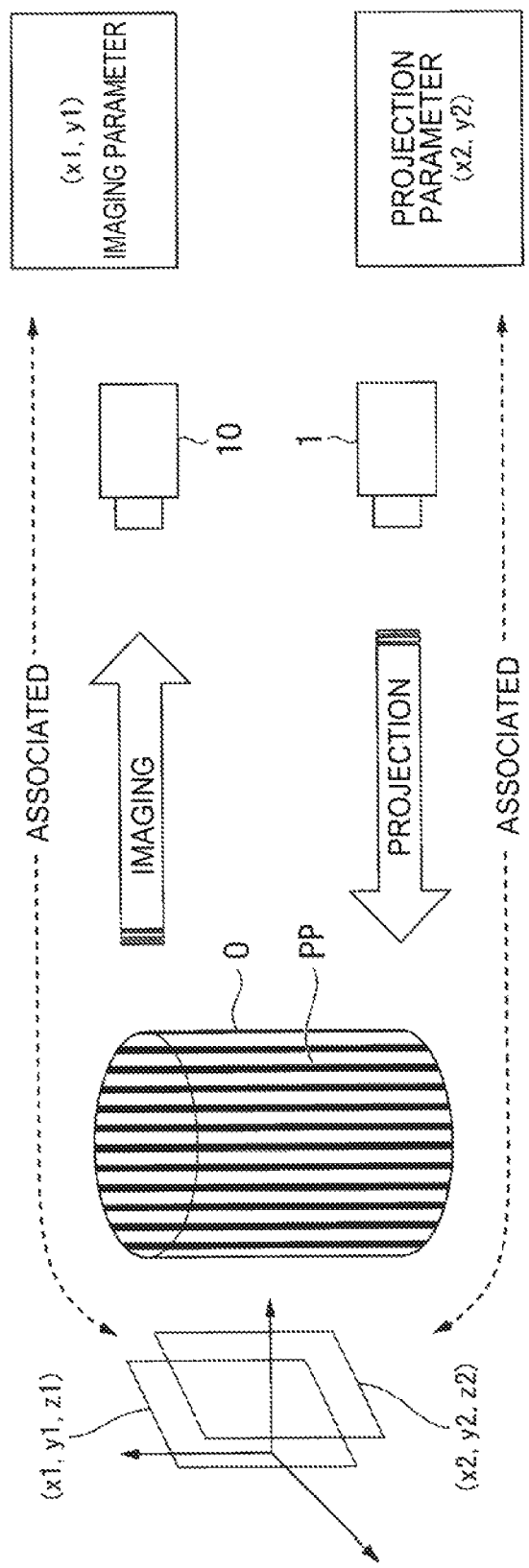
FIG. 5 is a diagram schematically showing an example of a process of a three-dimensional position detection section 23 detecting three-dimensional position information.

Here, the process of the three-dimensional position detection section 23 detecting the three-dimensional position information will be explained with reference to FIG. 5. FIG. 5 is a diagram schematically showing an example of the process of the three-dimensional position detection section 23 detecting the three-dimensional position information. In FIG. 5, the object O is shown alone as a part of the projection surface PA, and the periphery of the object O is omitted. The control section 20 makes the projector 1 project the projection image PP as the gray code to the object O. The control section 20 makes the imaging section 10 take an image of the object O on which the projection image PP is projected. Further, the three-dimensional position detection section 23 detects the distances from the optical center of the imaging section 10 to the positions represented by the world coordinates associated with the respective points on the taken image XC using the active shutter 3D method based on the taken image obtained by taking the image of the object O on which the projection image PP is projected. The three-dimensional position detection section 23 reads in the imaging parameter and the projection parameter, and then associates the x coordinate, the y coordinate, and the z coordinate in the world coordinate system with each other based on the imaging parameter and the projection parameter thus read in and the distances thus detected to thereby obtain the three-dimensional position information.

Then, the control section 20 stops the projection of the projection image PP from the projector 1, and then makes (step S130) the imaging section 10 take an image of the projection surface PA, which is in the state in which nothing is projected on the projection surface PA, as the taken image C. Then, the display state control section 24 reads in the imaging parameter and the projection parameter, and then performs (step S140) a geometric correction on the taken image C.

Here, the geometric correction performed by the display state control section 24 will be described. In the case in which the imaging section 10 and the projection optical system 40 of the projector 1 are different in optical axis from each other, if the taken image C is directly projected to the object O as the projection image P, the image of the object O on the projection image P does not completely coincide with the object O. This misalignment is caused by an influence of the distortion due to the difference in optical axis. The geometric correction denotes the process of correcting the influence of the distortion. In the case in which the taken image C is projected to the object O as the projection image P, the display state control section 24 performs the geometric correction on the taken image C so that the image of the object O on the projection image P and the object O completely coincide with each other.

Figures 6A, 6B, 6C:
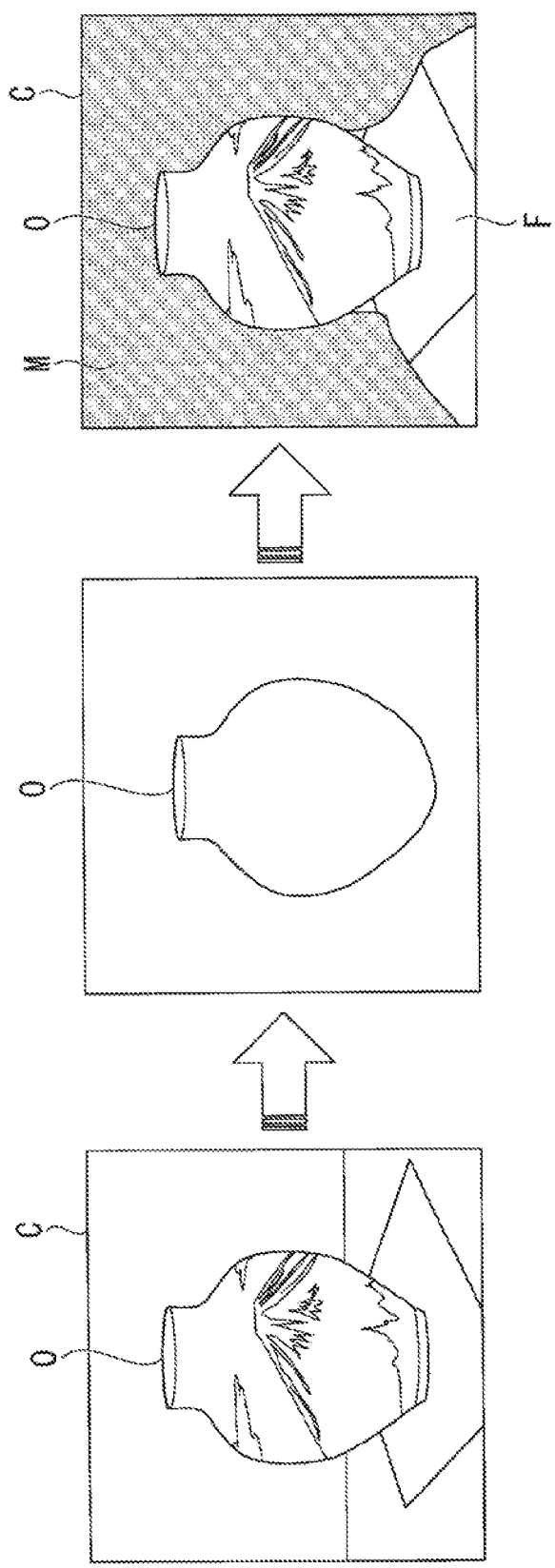
FIGS. 6A through 6C are diagrams schematically showing an example of a flow of a process of a display state control section 24 setting the mask area M to a taken image C.

Subsequently, the control section 20 performs (step S150) a color correction on the taken image C, on which the geometric correction has been performed, using affine transformation of the color space of the imaging section 10 and the projector 1 having previously been obtained using the calibration. It should be noted that the display state control section 24 can be provided with a configuration of not performing the color correction in the step S150. Then, the display state control section 24 sets (step S160) the mask area M to the taken image C, on which the geometric correction and the color correction have been performed. Here, the process of the display state control section 24 setting the mask area M to the taken image C will be explained with reference to FIGS. 6A through 6C. FIGS. 6A through 6C are diagrams schematically showing an example of a flow of the process of the display state control section 24 setting the mask area M to the taken image C.

FIG. 6A shows the taken image C, which the control section 20 has made the imaging section 10 take in the step S130, on which the geometric correction has been performed in the step S140, and the color correction has been performed in the step S150. The display state control section 24 superimposes distance information image generated based on the three-dimensional position information representing the three-dimensional shape shown in FIG. 6B with the taken image C shown in FIG. 6A. The distance information image denotes an image formed by expressing the distances from the optical center of the imaging section 10 with respective colors, and the brighter the color is, the nearer the point expressed by the color is, and the darker the color is, the further the point expressed by the color is.

The display state control section 24 sets an area, which is distant as much as a distance longer than a predetermined distance (which has colors darker than a predetermined brightness), as the mask area M to FIG. 6A based on the image shown in FIG. 6B. FIG. 6C shows the taken image C to which the mask area is set. It should be noted that the display state control section 24 can also be provided with a configuration of reading in the three-dimensional position information representing the three-dimensional shape and then setting the area, which is distant from the optical center of the imaging section 10 as much as a distance longer than the predetermined distance, as the mask area M instead of the configuration of setting the mask area M after superimposing the distance information image with the taken image C.

Then, the display state control section 24 generates the image information of the taken image C, on which the mask area M is set, in the projection image generation section 22 in order to project the taken image C, to which the mask area M is set, as the projection image P. Then, the control section 20 projects (step S170) the projection image P from the projection optical system 40 toward the projection surface PA. As described above, the control section 20 sets the mask area M to the taken image C, and then projects the taken image C, to which the mask area M is set, on the projection surface PA as the projection image P. It should be noted that the step S100 and the step S110 correspond to the calibration, and are therefore not required to be performed repeatedly every time the object O is replaced with another object after performed once when installing the projector 1.

Further, the control section 20 can be provided with an adjustment section for adjusting the projection optical system 40 so that the focal position set when projecting the projection image P falls within the range of the distance from the optical center of the imaging section 10 to the object O. By providing the control section 20 with the adjustment section, the projector 1 can focus the projection image P on the object O, and as a result, the object O can more clearly emphasize the object O even in the case in which the relative positional relationship between the object O and the projector 1 is changed.

Further, the display state control section 24 can also be provided with a configuration of setting the area, which is distant as much as a distance longer than a predetermined distance L1 (which has colors darker than a predetermined brightness), as a first area, setting the area, which is distant as much as a distance shorter than a predetermined distance L2, as a second area, and setting the area within a distance range of the predetermined distances L1 through L2 as a third area to the image shown in FIG. 6A based on the image shown in FIG. 6B, and then setting either one or both of the first area and the second area as the mask area M when setting the mask area M to the taken image C. In the case in which the display state control section 24 has such a configuration, the projector 1 can more surely inhibit the area other than the object O from being emphasized. It should be noted that in this example, it is assumed that the distance L1 is a distance shorter than the distance L2.

Further, the display state control section 24 can also be provided with a configuration of setting the area within a distance range between the predetermined distance L1 and the predetermined distance L2 as a first area, setting the area, which is distant as much as a distance longer than a predetermined distance L1, and the area, which is distant as much as a distance shorter than a predetermined distance L2, as second areas to the image shown in FIG. 6A based on the image shown in FIG. 6B, and then setting either one of the first area and the second areas as the mask area M when setting the mask area M to the taken image C.

As explained hereinabove, the projector 1 according to the first embodiment projects the projection image P to the projection surface PA including the object O, then detects the distance from the predetermined position to the object O, then sets the area of the projection image P to be projected to the projection surface PA other than the object O is set as the mask area M based on the distance thus detected, and then changes the display state of the projection image P so that the mask area M thus set is masked. Therefore, it is possible for the projector 1 to change the appearance of the projection image P in accordance with the distance from the projector 1 to the object O to which the projection image P is projected.

Further, the projector 1 change the display state of the projection image P so that the mask area M is masked by preventing the light from being projected. Therefore, the projector 1 can inhibit the light from the projector 1 from bedazzling the person having entered the area set as the mask area M, and can further inhibit the area other than the object O from being emphasized.

Further, the projector 1 change the display state of the projection image P so that the mask area M is masked by projecting an image with a single color. Therefore, the projector 1 can inhibit the area other than the object O from being emphasized.

Further, the projector 1 detects the distance from the optical center of the imaging section 10 to the object O based on the taken image. Therefore, the projector 1 can detect the distance from the optical center of the imaging section 10 to the object O without using an additional sensor for measuring the distance, and thus, the cost and the trouble for installing the additional sensor can be saved.

Further, the projector 1 adjusts the focal position set when projecting the projection image P so as to fall within the range of the distance from the optical center of the imaging section 10 to the object O. Therefore, it is possible for the projector 1 to focus the projection image P on the object even in the case of changing the relative positional relationship between the object O and the projector 1.

Further, the projector 1 sets a first partial area having the distance described above longer than a first threshold value, a second partial area having the distance described above shorter than a second threshold value, and a third partial area having the distance described above within the range between the first threshold value and the second threshold value as the mask area corresponding to the distance from the optical center of the imaging section 10 to the object O, and then changes the display state of the projection image P so that at least one of the first partial area, the second partial area, and the third partial area is masked. Therefore, the projector 1 can more surely inhibit the area other than the object O from being emphasized by setting, for example, the area further than the object O as the first area, and the area nearer than the object O as the second area, and masking the first area and the second area.

Second Embodiment

Figure 7:
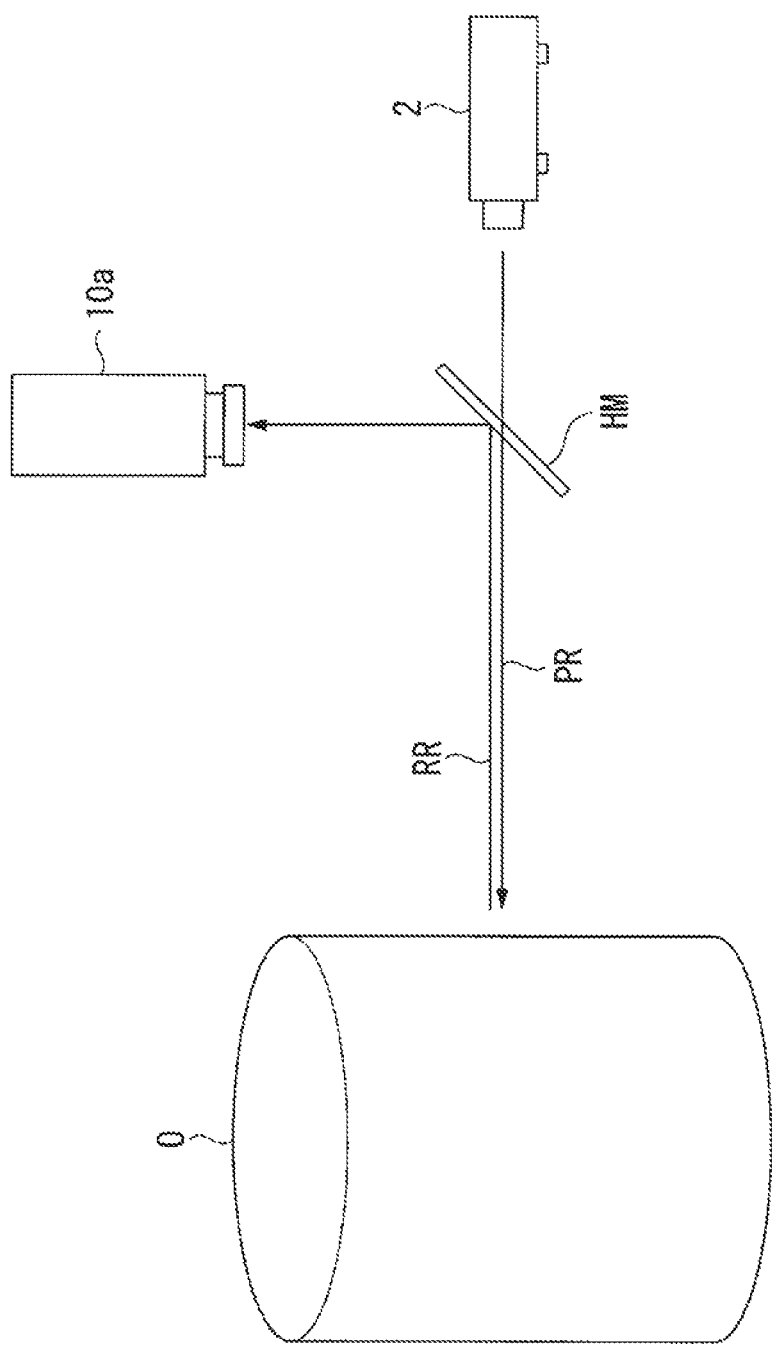
FIG. 7 is a diagram schematically showing an example of how a projector 2 according to a second embodiment of the invention is used.

A second embodiment of the invention will hereinafter be explained with reference to the accompanying drawings. FIG. 7 is a diagram schematically showing an example of how a projector 2 according to the second embodiment is used. The projector 2 according to the second embodiment is formed as a member separated from an imaging section 10a and is connected to the imaging section 10a with wire or wirelessly so as to be able to communicate with the imaging section 10a. Further, the optical axis PR of the projector 2 is disposed to form the same straight line with the optical axis RR of the imaging section 10a via a half mirror HM. The half mirror HM transmits a part of the incident light, and reflects the rest of the incident light in a direction perpendicular to the incident light.

Further, since the projector 2 according to the second embodiment has the optical axis arranged to form the same straight line with the optical axis of the imaging section 10a, and therefore, the three-dimensional position information representing the three-dimensional shape of the projection surface PA cannot be detected using the active shutter 3D method, the projector 2 detects the distance from the optical center of the imaging section 10a to each point of the projection surface PA on the taken image C using a depth sensor not shown in FIG. 7. It should be noted that it is assumed that the world coordinate, the coordinate on the taken image C, and the coordinate on the projection image P of the point, the distance of which is to be detected by the depth sensor, are associated with each other in advance due to the calibration or the like.

Figure 8:
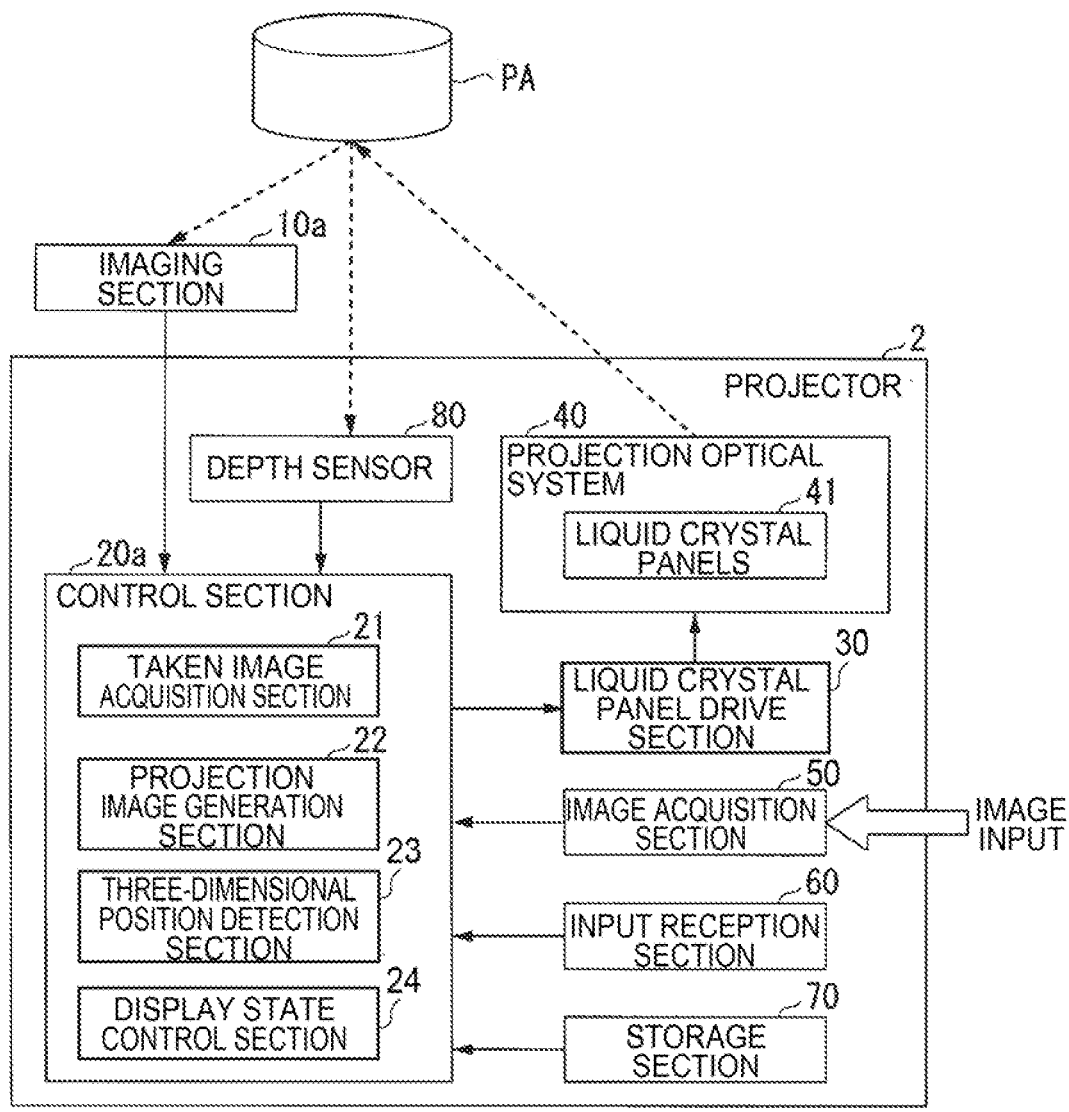
FIG. 8 is a diagram showing an example of a functional configuration of the projector 2.

Then, a functional configuration of the projector 2 will be explained with reference to FIG. 8. FIG. 8 is a diagram showing an example of the functional configuration of the projector 2. The projector 2 is connected so as to be able to communicate with the imaging section 10a, and is provided with a control section 20a, the liquid crystal panel drive section 30, the projection optical system 40, the image acquisition section 50, the input reception section 60, the storage section 70, and the depth sensor 80. It should be noted that in the description of the second embodiment, the constituents substantially the same as in the first embodiment are denoted with the same reference symbols, and the explanation thereof will be omitted. Further, the depth sensor 80 can also be hardware integrated with the imaging section 10a or the projector 2.

The imaging section 10a is, for example, a camera provided with an imaging element for converting the light collected into an electric signal such as a CCD or a CMOS. In the second embodiment, the imaging section 10a is formed of hardware separated from the projector 2. The imaging section 10a has the optical axis RR arranged to form the same straight line with the optical axis PR of the projector 2 via the half mirror HM, and can take an image of a part or the whole of a range including the projection surface PA.

The control section 20a controls the imaging section 10a with wire or wirelessly to take an image of an imaging range including the projection surface PA. Further, the control section 20a makes the depth sensor 80 detect the distance, and then obtains the distance thus obtained from the depth sensor 80.

The depth sensor 80 is a sensor provided with, for example, a laser beam irradiation section for applying a laser beam, and a laser beam detection section for detecting the laser beam having been reflected, and measuring the distance to the object irradiated with the laser beam with the same principle as the active shutter 3D method. The depth sensor 80 outputs the information representing the distance thus detected to the control section 20a.

Figure 9:
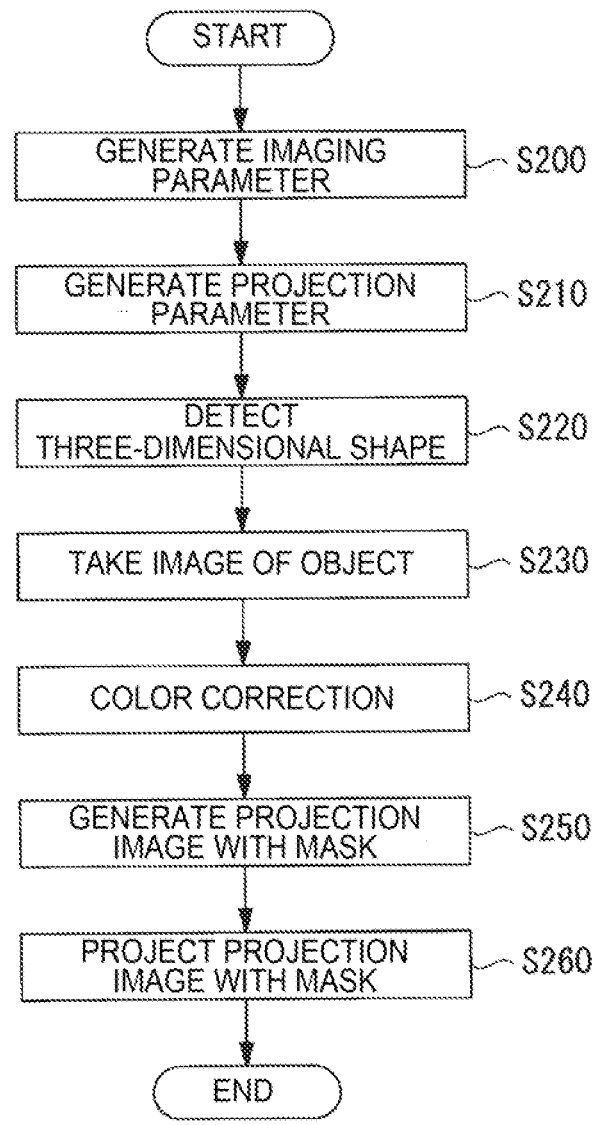
FIG. 9 is a flowchart showing an example of a flow of a process performed until a control section 20a projects the projection image P to which the mask area M is set.

Hereinafter, a process performed until the control section 20a projects the projection image P, to which the mask area M is set, will hereinafter be explained with reference to FIG. 9. FIG. 9 is a flowchart showing an example of a flow of the process performed until the control section 20a projects the projection image P, to which the mask area M is set. Here, the three points in which the process of the flowchart shown in FIG. 9 is different from the process of the flowchart shown in FIG. 4 are the point that the control section 20a makes the imaging section 10a take an image of the imaging range, the point that the geometric correction is not performed on the taken image C, and the point that the distance from the optical center of the imaging section 10a to each point of the projection surface PA on the taken image C is detected by the depth sensor 80.

More specifically, in the steps S200 through S210, the control section 20a performs substantially the same process as in the steps S100 through S110 shown in FIG. 4. Then, in the step S220, the three-dimensional position detection section 23 detects the distance from the optical center of the imaging section 10a to each point of the projection surface PA from the depth sensor 80, then reads in the imaging parameter and the projection parameter from the storage section 70, and then detects the three-dimensional position information representing the three-dimensional shape of the projection surface PA based on the distances thus detected, and the imaging parameter and the projection parameter thus read in.

Subsequently, the control section 20a makes the imaging section 10a take the image of the projection surface PA to obtain (step S230) the taken image C. Then, the display state control section 24 performs (step S240) the color correction on the taken image C thus obtained. Then, in the steps S250 through S260, the display state control section 24 performs substantially the same process as the process in the steps S160 through S170.

As shown in FIG. 7, the optical axis PR of the projector 2 and the optical axis RR of the imaging section 10a are arranged to form the same straight line via the half mirror HM. Therefore, in the case in which the taken image C is projected to the projection surface PA as the projection image P with the geometric correction not performed on the taken image C, the image of the object O on the projection image P and the object O completely coincide with each other. Therefore, the control section 20a of the projector 2 according to the second embodiment is not required to perform the geometric correction. It should be noted that similarly to the projector 1 according to the first embodiment, the projector 2 according to the second embodiment can also be provided with a configuration of not performing the color correction in the step S240.

As explained hereinabove, the projector 2 according to the second embodiment detects the distance from the optical center of the imaging section 10a to the object O using the depth sensor. Therefore, the optical axis of the projector 2 can be made to coincide with the optical axis of the imaging section 10 for taking the image of the object O by, for example, using the half mirror HM, and as a result, the object O can more simply and easily be emphasized without performing the geometric correction to the projection image P projected by the projector 2.

It should be noted that it is also possible to arrange that a program for realizing the function of an arbitrary constituent in the projectors 1, 2 explained hereinabove is recorded on a computer readable recording medium, and then the program is read and then performed by a computer system. It should be noted that the "computer system" mentioned here should include an operating system (OS) and hardware such as peripheral devices. Further, the "computer-readable recording medium" denotes a portable medium such as a flexible disk, a magneto-optical disk, a read only memory (ROM), and a compact disk (CD)-ROM, and a storage device such as a hard disk incorporated in the computer system. Further, the "computer-readable recording medium" should include those holding a program for a certain period of time such as a volatile memory (a RAM) in the computer system to be a server or a client in the case of transmitting the program via a network such as the Internet, or a communication line such as a telephone line.

Further, the program described above can be transmitted from the computer system having the program stored in the storage device or the like to another computer system via a transmission medium or using a transmission wave in the transmission medium. Here, the "transmission medium" for transmitting the program denotes a medium having a function of transmitting information such as a network (a communication network) such as the Internet or a communication line (a communication wire) such as a telephone line.

Further, the program described above can be for realizing a part of the function described above. Further, the program described above can be a program, which can realize the function described above when being combined with a program recorded on the computer system in advance, namely a so-called differential file (a differential program).

What is claimed is:

1. A projector comprising:
   a projection section adapted to project a projection image on a projection surface, the projection surface including a target part;
   a detection section adapted to detect a distance from a predetermined position to the target part of the projection surface; and
   a control section adapted to set a partial area in the projection image based on the distance, and change a display state of the projection image so that the partial area is masked, the partial area being projected on a part of the projection surface other than the target part.

2. The projector according to claim 1, wherein
   the control section changes the display state of the projection image so that the partial area is masked by preventing light from being projected.

3. The projector according to claim 1, wherein
   the control section changes the display state of the projection image so that the partial area is masked by projecting an image with a single color.

4. The projector according to claim 1, further comprising:
   an imaging section adapted to take a taken image including the target part,
   wherein the detection section detects the distance based on the taken image.

5. The projector according to claim 1, wherein
   the detection section is a depth sensor.

6. The projector according to claim 1, further comprising:
an adjustment section adapted to adjust the projection section so that the projection image is focused on a predetermined position in the target part when projecting the projection image.

7. The projector according to claim 1, wherein
the control section sets a first partial area having the distance longer than a first threshold value, a second partial area having the distance shorter than a second threshold value, and a third partial area having the distance within a range between the first threshold value and the second threshold value as the partial area, and changes the display state of the projection image so that either one or both of the first partial area and the second partial area is masked.

8. The projector according to claim 1, wherein
at least a portion of the part of the projection surface on which the partial area is projected is disposed in a periphery of the target part.

9. A projection image control method comprising:
projecting a projection image on a projection surface, the projection surface including a target part;
detecting a distance from a predetermined position to the target part of the projection surface; and
setting a partial area in the projection image based on the distance, and changing a display state of the projection image so that the partial area is masked, the partial area being projected on a part of the projection surface other than the target part.

10. The projector according to claim 1, wherein
at least a portion of the part of the projection surface on which the partial area is projected is disposed further from the projector than the target part.

11. The projection image control method according to claim 9, wherein
at least a portion of the part of the projection surface on which the partial area is projected is disposed further from a projector which projects the projection image than the target part.

12. The projection image control method according to claim 9, wherein
at least a portion of the part of the projection surface on which the partial area is projected is disposed in a periphery of the target part.

* * * * *